US006761490B2

(12) United States Patent
Wada et al.

(10) Patent No.: US 6,761,490 B2
(45) Date of Patent: Jul. 13, 2004

(54) CAPILLARY FOR OPTICAL FIBER AND FERRULE FOR OPTICAL CONNECTOR FOR REDUCING CONNECTION LOSS

(75) Inventors: Masanori Wada, Otsu (JP); Hirokazu Takeuchi, Youkaichi (JP); Kazuya Saito, Shiga-Ken (JP)

(73) Assignee: Nippon Electric Glass Co., Ltd., Shiga-Ken (JP)

( * ) Notice: Subject to any disclaimer, the term of this patent is extended or adjusted under 35 U.S.C. 154(b) by 0 days.

(21) Appl. No.: 10/300,296

(22) Filed: Nov. 19, 2002

(65) Prior Publication Data

US 2003/0095753 A1 May 22, 2003

(30) Foreign Application Priority Data

Nov. 19, 2001 (JP) ........................................ 2001-352986

(51) Int. Cl.[7] .............................. G02B 6/36; G02B 6/38
(52) U.S. Cl. ........................................... 385/78; 385/68
(58) Field of Search ............................... 385/78, 84, 80, 385/66, 68

(56) References Cited

U.S. PATENT DOCUMENTS

| 4,931,120 | A | * | 6/1990 | Christoff | 156/153 |
| 5,615,291 | A | * | 3/1997 | Hayakawa et al. | 385/84 |
| 6,126,844 | A | * | 10/2000 | Hirsch | 385/133 |
| 6,213,649 | B1 | * | 4/2001 | Omiya et al. | 385/60 |
| 6,435,731 | B1 | * | 8/2002 | Yamaguchi et al. | 385/78 |

* cited by examiner

Primary Examiner—Chandrika Prasad
(74) Attorney, Agent, or Firm—J.C. Patents (57) ABSTRACT

The capillary for optical fiber has an inner hole allowing an optical fiber to be inserted and retained therein. Ra value of the surface roughness of the inner hole is 0.1 μm to 0.5 μm. The ferrule for optical connector is provided with a chamfered part on one end of the capillary for optical fiber for guiding it into a sleeve and a flared part on the other end of the capillary for optical fiber for guiding the optical fiber into the inner hole.

20 Claims, 8 Drawing Sheets

FIG. 2 electro microscopic picture of the polished end face of a crystallized glass ferrule

FIG. 3

Connection losses resulted from non-core-adjusting connection of optical connectors
non-core-adjusting connection using a crystallized glass ferrule with a concentricity of 1.0μm or less

FIG. 4

Connection losses resulted from non-core-adjusting connection of optical connectors
non-core-adjusting connection using a crystallized glass ferrule with a concentricity of 0.7μm or less

FIG. 5 electro microscopic picture of the polished end face of a zirconia ceramic ferrule

FIG. 6

Connection losses resulted from non-core-adjusting connection of optical connectors
non-core-adjusting connection using a crystallized glass ferrule with a concentricity of 1.0μm or less

FIG. 7 adhesive layer electro microscopic picture of the polished end face of a glass ferrule

FIG. 8

Connection losses resulted from non-core-adjusting connection of an optical connector using a glass ferrule

CAPILLARY FOR OPTICAL FIBER AND FERRULE FOR OPTICAL CONNECTOR FOR REDUCING CONNECTION LOSS

CROSS-REFERENCE TO RELATED APPLICATION

This application claims the priority benefit of Japanese application serial no. 2001-352986, filed on Nov. 19, 2001.

BACKGROUND OF INVENTION

The present invention relates to a capillary for optical fiber, a ferrule for optical connector, and an optical-fiber-fixed capillary in which an optical fiber is inserted and fixed into an inner hole of a capillary for optical fiber, which are used for manufacturing optical devices.

Recent rapid development of optical communication networks has raised the need for large quantities of high performance, inexpensive optical devices. For a plug-type optical device or a receptacle-type optical device with a built-in optical fiber, in particular, a cylindrical optical-fiber-fixed capillary, called optical fiber stub, formed by inserting an optical fiber into an precise capillary to be fixed with an adhesive, and an optical connector plug are employed.

Figure 12:
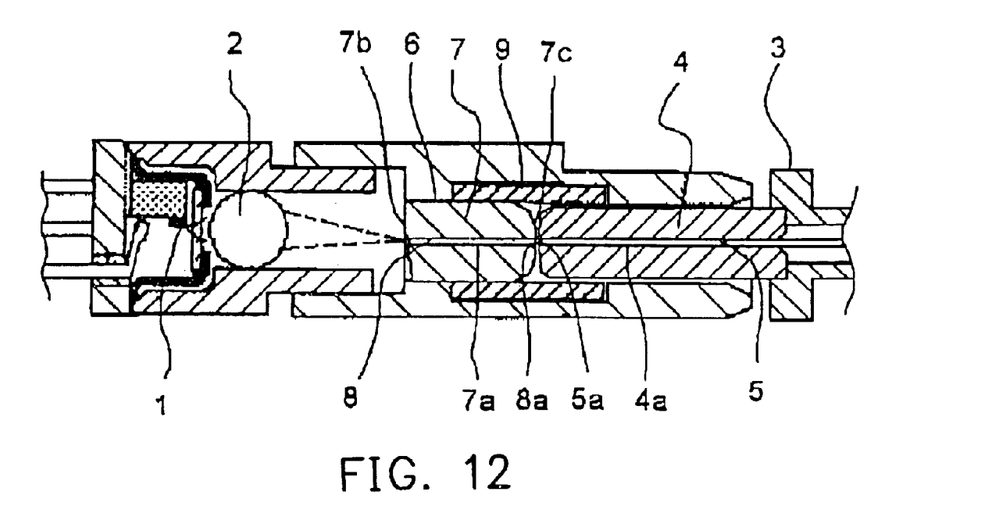
FIG. 12 is a cross sectional view of the optical fiber stub formed by processing the optical-fiber-fixed capillary used for an optical module.

For example, as shown in FIG. 12, when one end face of an optical-fiber-fixed capillary is ground into a convex-sphere and the other end face is ground (or polished) into an inclined surface, the capillary comes to work as an optical fiber stub 6. The optical fiber stub 6 is used for receiving an optical signal emitted from a laser diode 1 and focused by a lens 2, transmitting the signal to an optical fiber 5 in a ferrule 4 for optical connector of an optical connector plug 3, or for making the signal emitted from the optical fiber 5 in an inner hole 4a of the ferrule 4 for optical connector focus on a photodiode and the like which is not graphically represented.

An end face 7b of the optical fiber stub 6 is ground so that the reflection axis of the optical signal makes an angle of several degrees against the incident axis of the optical signal. This arrangement is made to prevent such a phenomenon from occurring at the end face 7b of the capillary 7 for optical fiber on the side of the laser diode 1 (or photodiode) that a reflected light comes into the laser diode 1 and becomes a noise. An end face 7c opposite to the end face 7b is ground to form a convex-sphere having a center on an end face 8a of an optical fiber 8 so that the optical fiber 8 is abutted on the optical connector plug 3 to be able to make PC (Physical Contact) connection.

As shown in FIG. 12, the connection between the optical connector plug 3 and the optical fiber stub 6 is made via PC connection, for which the end face 8a of the optical fiber 8 of the optical fiber stub 6 is abutted on a convex-spherical end face 5a of an optical fiber 5 of the optical connector plug 3 in a split sleeve 9.

Figure 13:
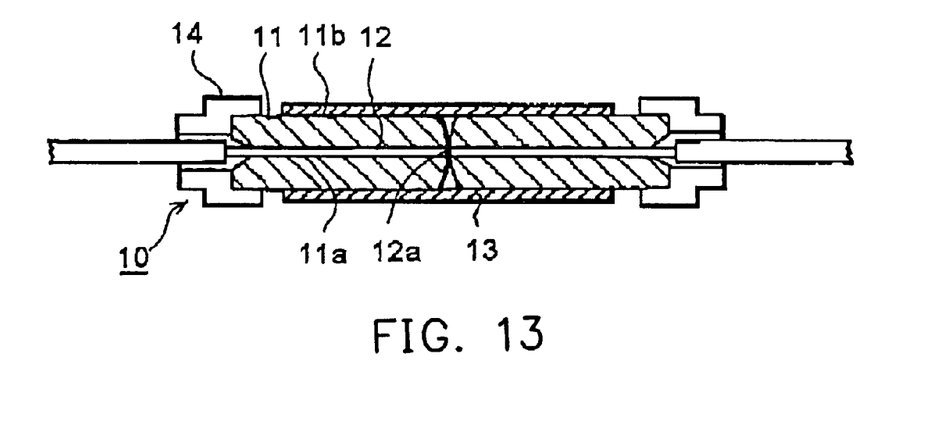
FIG. 13 is a cross sectional view of the details of the optical connector used for PC connection.

Such an optical signal connection as described above is made typically by connecting optical connectors used for high capacity optical communication. For connecting optical connectors, as shown in FIG. 13, a ferrule 11 for optical connector is employed to form an optical connector plug 10, the ferrule 11 formed by processing an precise capillary, which has an inner hole 11 a with an inner diameter for allowing an optical fiber 12 to be inserted therein, into a prescribed shape. The optical fiber 12 is inserted into the inner hole 11a to be glued thereto with an adhesive and one end face of the ferrule 11 is machined into a convex-sphere.

The connection between these optical plugs 10 are made via PC connection, in which respective end face 12a of the optical fiber 12 abut each other in a split sleeve 13. A connection loss resulted from the PC connection mainly caused by an axial dislocation between the optical fibers 12 occurring at the connecting part. The axial dislocation occurs as the result from accumulated factors of the outer diameter difference between used ferrules 11 for optical connector, the circularity (or roundness) of the inner hole 11a at the end face and the cylindricity of an outer periphery 11b, the concentricity between the inner hole 11a of the ferrule 11 for optical connector and the outer periphery 11b, and the eccentricity of the optical fiber 12 in the inner hole 12 at the end face. Out of these factors, the concentricity between the inner hole 11a of the ferrule 11 for optical connector at the end face and the outer periphery 11b, and the eccentricity of the optical fiber 12 in the inner hole 11a at the end face are the major factors relating to the axial dislocation between the optical fibers to be abutted. With this reason, the concentricity of the ferrule 11 for optical connector is required to be 1.4 μm or less for an application to communication using a single mode optical fiber. Also, a ferrule having the inner hole 11a larger than the outer diameter of the optical fiber 12 to be inserted by 0 to 1 μm is employed for such a communication. The relation between the axial dislocation d of the optical fiber 12 and a connection loss (measuring unit: dB) is represented generally by the following equation (1) when the core diameter of the optical fiber is symbolized by w.

$$\text{Loss} = 4.34(d/(w/2))^2 \quad (1)$$

Here, a consideration is made on the cause of connection loss by focusing on the concentricity between the inner hole 11a and the outer periphery 11b, and the eccentricity of the optical fiber 12 in the inner hole 11a. A case to be considered first is to use the ferrule 11 for optical connector, whose concentricity is 1.4 μm or less and the inner hole 11a has an inner diameter larger than the outer diameter of the optical fiber 12 by 1 μm. When the optical fiber becomes eccentric in the inner hole 11a by 0.5 μm in one ferrule on the assumption that the other ferrule to be abutted is subjected to the same eccentricity, the worst axial dislocation to be estimated is 2.4 μm, which is the dislocation value bringing a connection loss of 1.0 dB in maximum according to the above equation (1). Given this conclusion, the ferrule 11 for optical fiber must be revolved in a core adjusting operation in order to achieve a connection loss of 0.5 dB or less, which is specified as the standard value of an communication optical connector employing a quartz single mode optical fiber (JIS-C-5962). Actual core adjusting operation, however, tends to be extraordinary cumbersome. For example, the concentricity between the inner hole 11a and the outer periphery 11b is measured first at the end face of the ferrule 11 for optical connector, and an eccentric direction is marked on the side of a flange member 14 with 90 degree pitch (¼ revolution pitch), then assembling is made by aligning the eccentric direction of respective ferrule 11 for optical connection to be abutted. Or, in another example, while light is actually transmitted through the optical fiber and the intensity of the light is monitored with a power meter and the like, the ferrule 11 for optical fiber is revolved 90 degree at a time and the position for least connection loss is determined for assembling.

Meanwhile, the optical device represented by FIG. 12 is also subjected to the same axial dislocation described above. In this case, when the optical connector plug 3 and the optical fiber stub 6 is connected or an aligning position is determined between the optical axis of an optical signal focused by the lens 2 (or an emitted optical signal) and the center of the optical fiber 8 in the inner hole 7a of the capillary 7 for optical fiber used for the optical fiber stub 6, the end face 7b of the capillary 7 for optical fiber used for optical fiber stub 6 is ground (or polishing) to make an angle of several degrees and is fixed without a consideration for the eccentric direction of the optical fiber in the inner hole 7a, so that the core adjusting operation becomes structurally impossible. Therefore, as the optical connector plug and the optical fiber stub to be abutted have respective axial dislocation, the axial dislocation caused by the eccentricity of the optical fiber 8 in the inner hole 7a can not be reduced, so that the connection loss of optical signal increases.

For the mass production of the ferrule 11 for optical connector, as shown FIG. 13, with a severe dimensional accuracy that the tolerance of concentricity is 1.4 $\mu$m or less and the tolerance of inner diameter against the diameter of the optical fiber 12 is—0 $\mu$m/+1.0 $\mu$m, for example, when the ferrule 11 for optical connector is made of commonly employed zirconia ceramics, both the inner and outer surface of the ferrule 11 need to be ground so as to have a surface roughness with Ra value of less than 0.1 $\mu$m, because a sintered form of zirconia ceramics is processed to be used as the material for the ferrule.

It is known that when such a zirconia ceramic ferrule 11 for optical connector has the inner hole 11a having the surface roughness with Ra value of less than 0.1 and the optical fiber 12 is inserted and glued in the inner hole 11a, the optical fiber 12 tends to be decentered toward the side wall of the inner hole 11a and is difficult to be adjusted to the center of the inner hole 11a. The inventors of this invention have also confirmed the above fact. Therefore, the cumbersome core adjustment operation mentioned above has been imperative for the conventional zirconia ceramic ferrule 11 for optical connector, which has a small surface roughness, in order to achieve the specified connection loss value of 0.5 dB or less, which is registered as the standard for the quartz single mode optical fiber communication optical connector (JIS-C-5962). When connection between the optical fiber stub 6 and the optical connector plug 3 is made, as shown in FIG. 12, the same eccentric phenomenon occurs. In this case, the core adjusting operation can not be carried out due to the structural characteristics of the optical fiber stub 6, which makes it impossible to reduce the axial dislocation caused by the eccentricity of the optical fiber 8 in the inner hole 7a when the conventional zirconia ceramic capillary 7 for optical fiber is employed, so that the problem of increasing light signal loss remains.

Also, for optical devices of high capacity and/or high reliability applied to optical communication, a further lower connection loss, lower than the specified value for optical connector connection loss of 0.5 dB, may be required. To meet such a requirement, there is no other way but to set the stricter tolerance of the inner diameter 11a or of the concentricity of the ferrule 11 for optical connector shown in FIG. 13. With this reason, a number of ferrules 11 for optical connector are required to be manufactured so that a one with a good dimensional accuracy can be selected. As a result, the manufacturing cost of ferrules becomes higher. The optical fiber stub 6 formed by processing an optical-fiber-fixed capillary, as shown in FIG. 12, has the PC connection part with the structure equal to that of the ferrule for optical connector, making it impossible to carry out the core adjusting operation when a low connector connection loss equal to the above is required, which leads also to a stricter accuracy requirement to raise the problem of a higher production cost.

SUMMARY OF THE INVENTION

The object of the invention is to provide a capillary for optical fiber, which enables a connection loss lower than that of a conventional level, and a ferrule for optical connector and an optical-fiber-fixed capillary both using the capillary for optical fiber.

To achieve the above object, the inventors have accomplished the following invention. A capillary for optical fiber according to the present invention comprises an inner hole with an inner diameter allowing an optical fiber to be inserted and retained therein, wherein the Ra value of the surface roughness of the inner hole is 0.1 $\mu$m to 0.5 $\mu$m.

When the surface roughness Ra value of the inner hole of a capillary for optical fiber is less than 0.1 $\mu$m, an inserted optical fiber tends to approach the side wall of the inner hole to become eccentric, so that a core adjusting effect can not be expected. On the other hand, when the surface roughness Ra value of the inner hole exceeds 0.5 $\mu$m, Ry value defined as the maximum roughness is also expected to be considerably large. In such a case, the center of the maximum inscribed cylinder of the inner hole is decenterd in many cases against the center of the circle determined by the average line of the surface roughness of the inner hole, so that the original concentricity of the inner hole virtually deteriorates, or the surface of the inserted optical fiber may suffer scratches, raising a fear of decreasing strength of the optical fiber. It is essential for the capillary for optical fiber according to the present invention that the surface roughness Ra value of the inner hole is to be 0.1 $\mu$m to 0.5 $\mu$m.

For example, when an optical connector plug or an optical fiber stub is comprised of a capillary for optical fiber made of zirconia ceramics, the inner hole of the capillary is ground precisely to keep its surface roughness Ra value less than 0.1 $\mu$m and the strict dimensional accuracy (the inner diameter tolerance of—0 $\mu$m/+1.0 $\mu$m, concentricity tolerance of 1.4 $\mu$m or less) is achieved, so that the connection loss requirement for optical connector is met. However, when the surface roughness Ra value exceeds 0.5 $\mu$m, satisfying the above dimensional accuracy is difficult and mass production of optical connector plugs or optical fiber stubs becomes almost impossible.

Likewise, when an optical connector plug or optical fiber stub is comprised of a crystallized glass capillary for optical fiber manufactured by drawing forming, the surface roughness Ra value of over 0.5 $\mu$m makes it difficult to satisfy the strict dimensional accuracy required for capillaries for an optical fiber stub, so that mass production of inexpensive optical fiber stubs becomes also difficult.

The capillary for optical fiber according to the present invention has Ry value of the inner hole surface roughness of 4.0 $\mu$m or less.

There is a possibility, when the surface roughness Ry value of a capillary for optical fiber exceeds 4.0 $\mu$m, that the center of the maximum inscribed cylinder of the inner hole may be decentered against the center of the circle determined by the average line of the surface roughness of the inner hole. If this happens, the original concentricity of the inner hole virtually deteriorates and projected sharp peaks of the surface roughness of the inner hole may damage the surface of an inserted optical fiber. Therefore, it is essential for the capillary for optical fiber of the present invention that Ry value of the inner hole surface roughness is 0.4 $\mu$m or less.

The capillary for optical fiber according to the present invention has the inner hole in which the difference between the average line and the peak line of the surface roughness is 2.0 μm or less.

When the difference between the average line and the peak line of the surface roughness of the inner hole of a capillary for optical fiber, a specific value of the difference being defined in JIS-B-0601, exceeds 2.0 μm, there is a possibility that the center of the maximum inscribed cylinder of the inner hole may be decentered against the center of the circle determined by the average line of the surface roughness of the inner hole. If this happens, the original concentricity of the inner hole virtually deteriorates and projected sharp peaks of the surface roughness of the inner hole may damage the surface of an inserted optical fiber. When the capillary for optical fiber of the present invention is employed for comprising an optical-fiber-fixed capillary, such as an optical connector plug or an optical fiber stub, it is essential that the difference between the average line and the peak line of the surface roughness is 2.0 μm or less, even if the peaks and valleys of the surface roughness are not symmetrically with each other with respect to the average line of the surface roughness, in order to obtain the core adjusting effect for the optical fiber in the inner hole.

The capillary for optical fiber according to the present invention is made of crystallized glass formed by precipitating crystals in amorphous glass, wherein crystallized grains are precipitated on the surface of the inner hole.

As the crystal precipitated in amorphous glass in the present invention, a crystal grain having diameter of 0.1 μm to 1.0 μm is applicable to meet the condition that the Ra value of the surface roughness of the inner hole of the capillary for optical fiber is 0.1, to 0.5 μm. For example, β-spodumene crystal and the like are suitable.

The capillary for optical fiber according to the present invention has the inner hole, of which the surface has a prescribed surface roughness formed by a mechanical process mean.

As the mechanical process mean for providing the prescribed surface roughness on the inner hole surface of the capillary for optical fiber of the present invention, for example, an internal surface grinding or polishing, using a wire or abrasive grain, is generally performed to obtain a good dimensional accuracy upon manufacturing a capillary for optical fiber made of zirconia ceramics and the like. In this case, the surface roughness can be intentionally controlled within a prescribed range by using an internal grinding (or polishing) machine and the like before executing the finish grinding (or polishing). Such a process mean makes it possible to form an inner hole having the surface roughness Ra value of 0.1 μm to 0.5 μm, an inner hole having the surface roughness Ra value of 0.1 μm to 0.5 μm and the surface roughness Ry value of 4.0 μm or less, an inner hole having the surface roughness Ra value of 0.1 μm to 0.5 μm and the difference between the average line and the peak line of 2.0 μm or less, and an inner hole having both the above Ra value and Ry value and the difference δ between the average line and the peak line of 2.0 μm or less.

The description that the inner hole of the capillary for optical fiber has the inner diameter allowing an optical fiber to be inserted therein means that a pin gage having a diameter equal to that of the optical fiber can be inserted into the inner hole. The description that the inner diameter is larger than the optical fiber by 1 μm means that a pin gage having a diameter larger than the optical fiber by 1 μm can be inserted into the inner hole and a pin gage having a diameter surpassing such a size can not be inserted even if the surpassed size is a slight one. No gap between the inner hole and the optical fiber makes it impossible for the optical fiber to be inserted, and more than 2.0 μm gap makes an adhesive injected on the outer periphery of the optical fiber move along the periphery to gather in, increasing the eccentricity of the optical fiber in the inner hole.

The ferrule for optical connector according to the present invention is that the capillary for optical fiber as described above is formed with a chamfered part on one end thereof for guiding the ferrule into a sleeve, and a flared part opened to the other end thereof for guiding the optical fiber into the inner hole.

The ferrule for optical connector of the present invention is applicable when it has an outer diameter, an inner diameter, concentricity, and cylindricity, all of which allow the ferrule to be connected to an optical connector plug with a prescribed connection loss. The chamfered part for guiding the ferrule into the sleeve is applicable when the chamfered part has a dimension and shape equal to that of a known ferrule for optical fiber. As the flared part, it is desirable that it has a shape allowing the optical fiber to be easily inserted into the inner hole and a dimension preventing wide fluctuation of the connection loss caused by an ambient temperature change and the like after fixing the optical fiber. Further, a preliminary convex-spherical grinding (or polishing) for PC connection may be carried out, with putting the center of grinding (or polishing) on the end face of the inner hole into which the optical fiber is inserted, so that the ferrule can be connected to an optical connector plug via PC connection.

The optical-fiber-fixed capillary according to the present invention comprises the capillary for optical fiber as described above and an optical fiber inserted and fixed into the inner hole of the capillary for optical fiber.

The optical-fiber-fixed capillary of the present invention is provided in the form of an optical connector plug, an optical fiber stub, and a lengthy optical-fiber-fixed preliminary material, etc. These optical devices are applicable if they are the one allowing an optical fiber to be positioned precisely in the center of a capillary for optical fiber. When the optical plugs or optical fiber stubs and the like are abutted and connected in a precise sleeve, it is desirable that a chamfered part is formed at least one end face of the capillary for optical fiber or that a convex-spherical grinding (or polishing) is performed on the end face, with putting the center of grinding (or polishing) on the end of optical fiber, so as to make PC connection to an optical plug. The end face of the capillary for optical fiber is ground in such a way that the end face makes an angle of several degrees against the incident axis of a light signal in order to prevent a reflected light from coming into a laser diode to make noises. As an adhesive for gluing the optical fiber into the inner hole of the capillary for optical fiber, an epoxy-type one with proven effectiveness, an ultraviolet-curing-type one with excellent operability, and the like are appropriate according to the purpose of application.

Since the capillary for optical fiber according to the present invention has the inner hole having the surface roughness Ra value of 0.1 μm to 0.5 μm, due to the affection of the peaks higher than the average line and dispersed on the inner hole surface, the adhesive, including the epoxy-type one with proper viscosity, spreads uniformly in the circumferential direction to be retained on the surface of the inner hole in a stable manner, holding the optical fiber in the central position of the inner hole.

Also, the inner hole of the capillary for optical fiber of the present invention has the surface roughness Ry value of 4.0

μm or less, which prevents the center of the maximum inscribed cylinder of the inner hole from decentered against the center of the circle determined by the average line of the surface roughness of the inner hole. This fact ensures that a high circularity of the inner hole and the concentricity between the inner hole and the outer periphery of the capillary are retained so that a desired core adjusting effect is obtained and the surface of inserted optical fiber is not damaged.

Further, in the capillary for optical fiber of the present invention, the difference between the average line and the peak line of the surface roughness in the inner hole is 2.0 μm or less. Because of this fact, the center of the maximum inscribed cylinder of the inner hole is not decentered against the center of the circle determined by the average line of the surface roughness of the inner hole, even if the peaks and valleys of the surface roughness are not symmetrically with each other with respect to the average line of the surface roughness, so that the high circularity of the inner hole and the concentricity between the inner hole and the outer periphery of the capillary is secured and the surface of inserted optical fiber is not damaged. Thus, the desired core adjustment effect is obtained.

The capillary for optical fiber of the present invention is made of crystallized glass formed by precipitating crystals in amorphous glass. The crystallized glass is subjected to a heat treatment under a proper condition to precipitate crystallized grains on the surface of the inner hole, where the grains form the peaks. This process enables easy, effective manufacturing of the capillary having the inner hole with the surface roughness Ra value of 0.1 μm to 0.5 μm, the capillary having the inner hole with the surface roughness Ra value of 0.1 μm to 0.5 μm and Ry value of 4.0 μm or less, the capillary having the inner hole with the surface roughness Ra value of 0.1 μm to 0.5 μm and the difference between the average line and the peak line of 2.0 μm or less, and the capillary having the inner hole with the above surface roughness Ra and Ry values and the difference between the average line and the peak line of 2.0 μm or less.

In the capillary for optical fiber of the present invention, the inner hole has a prescribed surface roughness formed by a mechanical process mean. Therefore, the inner hole with surface roughness Ra value of 0.1 μm to 0.5 μm, the capillary having the inner hole with the surface roughness Ra value of 0.1 μm to 0.5 μm and Ry value of 4.0 μm or less, the capillary having the inner hole with the surface roughness Ra value of 0.1 μm to 0.5 μm and the difference between the average line and the peak line of 2.0 μm or less, and the capillary having the inner hole with the above surface roughness Ra and Ry values and the difference between the average line and the peak line of 2.0 μm or less, are manufactured under a room temperature by using the internal grinding (or polishing) machine and the like.

The ferrule for optical connector of the present invention is that the capillary for optical fiber as described above is formed with the chamfered part on one end thereof for guiding the ferrule into the sleeve and the flared part opened to the other end for guiding an optical fiber into the inner hole. Therefore, the optical fiber can be held precisely in the center of the inner hole of the ferrule for optical connector by the core adjusting effect produced by the above surface roughness of the inner hole of the invented capillary for optical fiber.

The optical-fiber-fixed capillary of the present invention comprises the capillary for optical fiber as described above and the optical fiber inserted and fixed into the inner hole of the capillary for optical fiber. Therefore, there is provided the optical-fiber-fixed capillary, in which the optical fiber is retained in the center of the inner hole by the core adjusting effect produced by the surface roughness of the inner hole.

BRIEF DESCRIPTION OF DRAWINGS

FIG. 1 (A) is a cross sectional view of a capillary for optical fiber according to an embodiment, FIG. 1 (B) is a cross sectional view of a ferrule for optical connector, and FIG. 1 (C) is a cross sectional view of a optical fiber stub.

FIG. 10 (A) is a cross sectional view showing the way of filling an adhesive into the capillary for optical fiber, FIG. 10 (B) is a cross sectional view showing the way of inserting an optical fiber into the capillary for optical fiber shown in FIG. 10, and FIG. 10(C) is a cross sectional view showing the way of hardening the adhesive.

FIG. 11 (A) is a cross sectional view of a short optical-fiber-fixed capillary having a prescribed length cut out from a lengthy optical-fiber-fixed capillary, FIG. 11 (B) is a cross sectional view of the short optical-fiber-fixed capillary whose end face is chamfered, FIG. 11 (C) is cross sectional view of an optical-fiber-fixed member, FIG. 11 (D) is a cross sectional view of showing the way of cutting slant the optical-fiber-fixed member, and FIG. 11 (E) is a cross sectional view of the optical fiber stub.

DESCRIPTION OF PREFERRED EMBODIMENT

The inventors have used, for example, a crystallized glass capillary for optical fiber having the composition shown in a table 1 as one example of the capillaries for optical fiber according to the present invention.

is fixed, using an adhesive 24, in an inner hole 22a having the above prescribed surface roughness. An end face 22c is

TABLE 1

| | | Sample No. | | | | |
|---|---|---|---|---|---|---|
| | | 1 | 2 | 3 | 4 | 5 |
| Glass composition (mass %) | $SiO_2$ | 57.8 | 66.3 | 67.4 | 64.3 | 65.9 |
| | $Al_2O_3$ | 24.6 | 18.2 | 16.6 | 18.0 | 18.2 |
| | $Li_2O$ | 2.7 | 2.3 | 2.3 | 2.5 | 2.0 |
| | $K_2O$ | 7.0 | 3.4 | 3.5 | 5.0 | 3.4 |
| | $TiO_2$ | 2.8 | 1.8 | 3.0 | 3.0 | 1.5 |
| | $ZrO_3$ | 3.2 | 1.8 | 1.8 | 2.0 | 1.8 |
| | ZnO | 1.0 | 3.1 | 2.0 | 3.1 | 3.6 |
| | MgO | — | 1.0 | 1.0 | 1.0 | 1.5 |
| | CaO | — | — | — | 0.4 | 0.6 |
| | BaO | — | — | — | 0.5 | 1.4 |
| | $B_2O_3$ | — | — | 2.0 | — | — |
| | $Na_2O$ | 0.4 | — | — | — | — |
| | $P_2O_5$ | — | — | 0.4 | — | — |
| | $As_2O_3$ | 0.5 | — | — | 0.2 | 0.1 |
| | $Bi_2O_3$ | — | 2.1 | — | — | — |
| Crystallization condition (° C.) core forming temperature | | 780 | 780 | 790 | 780 | 780 |
| Crystal growing temperature | | 1000 | 1000 | 980 | 1050 | 1000 |
| main crystal | | β-quartz solid solution | β-spodumene solid solution | β-spodumene solid solution | β-spodumene solid solution | β-spodumene solid solution |

Figure 1:
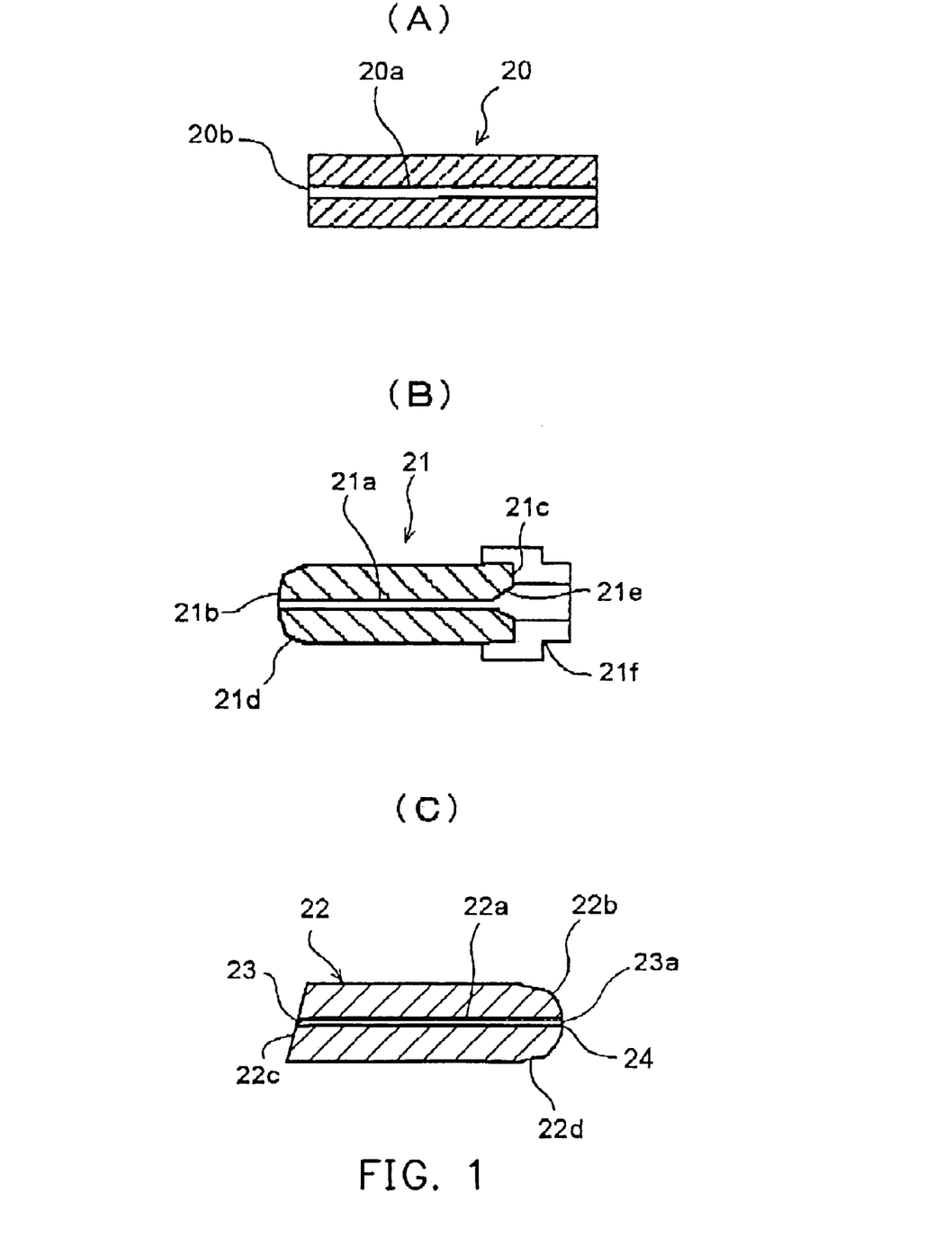

As shown FIG. 1 (A), the crystallized glass capillary 20 for optical fiber is manufactured. The capillary 20 for optical fiber has an inner hole 20a with the surface roughness Ra value of, for example, approximately 0.3 μm, Ry value of approximately 2.0 μm, the difference between the average line and the peak line of approximately 1.0 μm, wherein the inner diameter of the inner hole is approximately 1.0 μm (0.95 to 1.05 μm) larger than the outer diameter of an optical fiber to be inserted.

The ferrule 21 for optical connector shown in FIG. 1 (B) has been manufactured using the capillary for optical fiber 20. The manufactured ferrule 21 for optical fiber can be connected to an optical connector plug with a prescribed connection loss. For example, the ferrule 21 has an outer diameter of 1.249 mm±0.5 μm, and an inner hole 21a having the inner diameter of 0.125 mm±1/−0 μm, the inner hole having the above prescribed surface roughness and allowing an optical fiber to be inserted and fixed therein, wherein the concentricity of the ferrule 21 is 0.7 μm or less. The ferrule 21 further includes a flared part 21e opened to one end 21c for guiding the optical fiber into the inner hole 21a, a flange member 21f fixed to the ferrule 21 if necessary, and a C-chamfered part 21d formed on the outer end periphery of the ferrule on the other end 21b. Since the ferrule 21 for optical connector using the crystallized glass capillary 20 for optical fiber has a superior processability, it is easy to grind the ferrule 21, using a grinding (or polishing) machine and the like, so that it has a convex-sphere enabling a PC connection with an optical connector plug. When a grinding (or polishing) time is desired to be shortened, a preliminary convex-sphere may be formed with putting the center thereof on the end face of the inner hole 21a, as shown FIG. 1 (B).

The optical fiber stub 22 shown in FIG. 1 (C) has been manufactured using the crystallized glass capillary 20 for optical fiber. In the optical fiber stub 22, an optical fiber 23 ground (or polished) in such a way that it makes an angle of 8 degrees against the plane perpendicular to the incident axis of a light signal in order to prevent a reflected light from coming into a laser diode and the like to make noises. A C-chamfered part 22d is formed on the periphery of an end face 22b opposite to the end face 22c, which is ground (or polished) into a convex-sphere for PC connection with centering the grinding (or polishing) on the end face 23a of the optical fiber 23.

Figure 2:
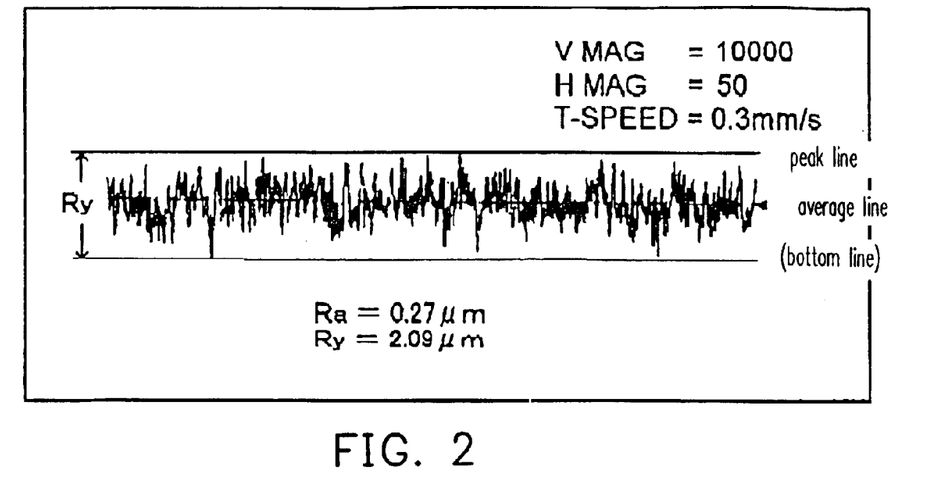
FIG. 2 is a chart representing the measurements of the surface roughness of the inner hole of the capillary for optical fiber according to the embodiment.

The surface roughness of the inner hole 20a of the capillary 20 for optical fiber has been actually measured using a surface roughness measuring apparatus. One example of the charts of the above measurement is shown in FIG. 2. In the case of this capillary 20 for optical fiber, the surface roughness Ra value is 0.27 μm, Ry value is 2.09 μm, and the difference δ between the average line and the peak line is 1.0 μm.

Figure 3:
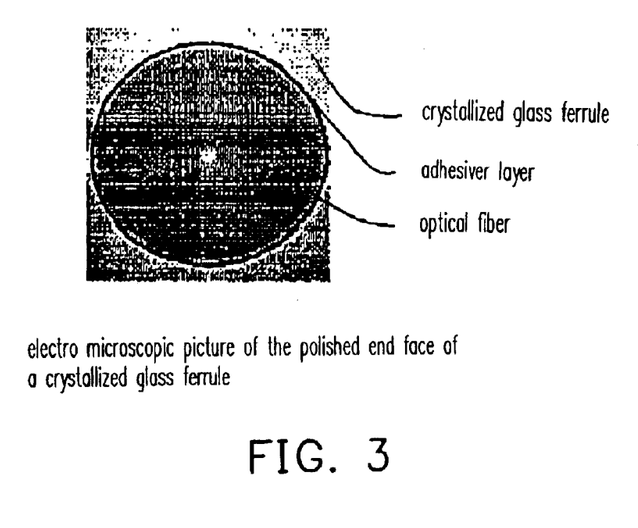
FIG. 3 is an electron microscopic picture of the end face of the ferrule for optical connector using a polished (or grinding) crystallized glass capillary.

An optical fiber is fixed, using an adhesive, into the ferrule 21 for optical connector manufactured using the capillary for optical fiber 20 and the end face of the ferrule 21 finished by grinding (or polishing) is observed via an electron microscope. As the adhesive for fixing the optical fiber, a commonly used epoxy adhesive is employed, and the hardening condition for the adhesive is 100° C. heat treatment for one hour. As shown in FIG. 3, the optical fiber is retained almost in the center of the inner hole via an adhesive layer of almost uniform thickness, wherein an axial dislocation is 0.1 μm, indicating that the core of the optical fiber is adjusted by approximately 0.4 μm from the theoretical maximum axial dislocation value.

Figure 4:
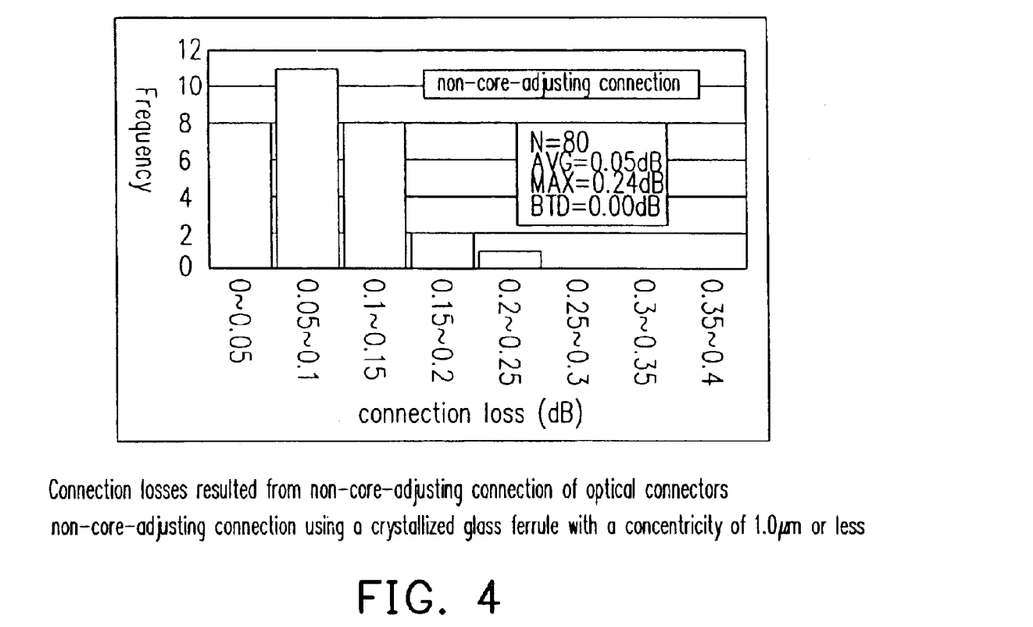
FIG. 4 represents the connection loss distribution of an optical connector using the crystallized glass capillary with a concentricity of 1.0 μm or less under the condition of non-core adjusting connection.

The inventors also have manufactured, using the capillary 20 for optical fiber as shown above, the ferrule 21 for optical connector, whose concentricity is 1.0 μm or less and inner hole 21a has a inner diameter larger than an optical fiber to be inserted by approximately 1 μm. The optical fiber is fixed, using the adhesive, into the ferrule 21 for optical connector, which is subjected to the convex-spherical finish grinding (or polishing) to form an optical connector plug. Under the condition shown in FIG. 13, 8 samples of the optical connector plugs are connected in random without carrying out the core adjusting operation and resulting connection losses are measured. Actual measurement results are shown in FIG. 4. When the optical fiber is not adjusted in the inner hole 21a of the ferrule 21 for optical connector, the theoretical maximum axial dislocation is 2.0 $\mu$m, which brings a connection loss of 0.69 dB in maximum, according to the equation (1) mentioned before. However, the actual result has shown an average connection loss of 0.08 dB, the maximum connection loss of 0.24 dB, and the standard deviation of 0.06 B under non-core-adjusting connection. To estimate the maximum value of connection loss, the value 3 time as much as the standard deviation $\sigma$ is added to the average value of connection loss and the maximum connection loss is calculated in 99.7% probability. The result is 0.26 dB. If the connection loss is 0.26 dB, the axial dislocation calculated according to the equation (1) becomes 1.2 $\mu$m. Therefore, the core adjusting effect on the optical fiber is calculated at approximately 0.4 $\mu$m when the optical fiber is inserted into the inner hole 21a of the ferrule 21, which is obtained under the condition that the inner hole 21a has Ra value of 0.27 $\mu$m, Ry value of 2.09 $\mu$m, and the surface roughness difference $\delta$ between the average line and the peak line of 1.0 $\mu$m. This calculation indicates that the eccentricity of optical fiber in the inner hole 21a is 0.1 $\mu$m, which is a rather small figure. The above fact coincides with an observation result by the electro microscopic picture of the end face shown in FIG. 3.

Figure 5:
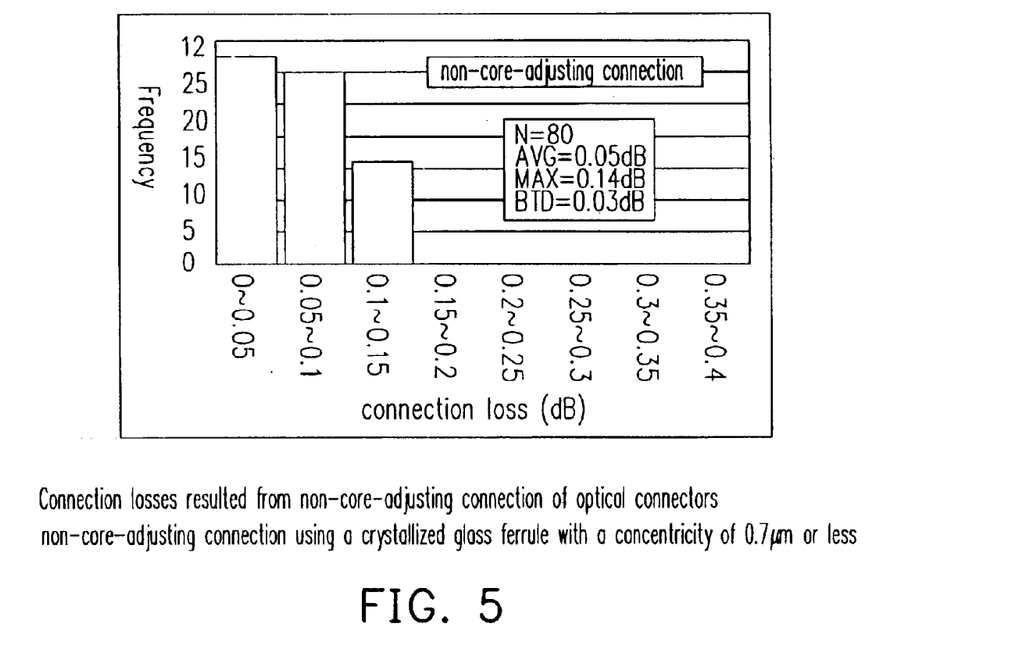
FIG. 5 represents the connection loss distribution of the optical connector using the crystallized glass capillary with a concentricity of 0.7 μm or less under the condition of non-core adjusting connection.

Further, according to the above process, the ferrule 21 for optical connector, whose concentricity is 0.7 $\mu$m or less and inner hole 21a has an inner diameter larger than the diameter of optical fiber by 1 $\mu$m, is manufactured, using the crystallized glass capillary 20 for optical fiber, in which the surface roughness Ra value of the inner hole 20a is approximately 0.3 $\mu$m, Ry value is approximately 2.0 $\mu$m, and the difference between the average line and the peak line is approximately 1.0 $\mu$m. An optical fiber is fixed into the ferrule 21 for optical connector, using the adhesive, and the ferrule 21 is subjected to the convex-spherical finish grinding (or polishing) to form an optical connector plug. Under the condition shown in FIG. 13, 14 samples of the made connector plug are connected in random without carrying out the core adjusting operation, and resulting connection losses is measured. Actual measurement result is shown in FIG. 5.

When the core of optical fiber is not adjusted, the theoretical maximum axial dislocation is 1.7 $\mu$m, which causes a connection loss of 0.5 dB in maximum according to the equation (1). However, the actual measurement has shown the result that the average connection loss is 0.06 dB, the maximum connection loss is 0.14 dB, and the standard deviation is 0.03 dB under the condition of non-core-adjusting connection. To estimate the maximum value of connection loss, the value 3 time as much as the standard deviation a is added to the average value of connection loss and the maximum connection loss is calculated in 99.7% probability. The result is 0.15 dB, from which the maximum axial dislocation is calculated at 0.9 $\mu$m according to the equation (1). Therefore, the above result demonstrates that the core adjustment effect on an optical fiber in the inner hole in the ferrule by the above surface roughness is approximately 0.4 $\mu$m. This result also coincides with the observation by the electro microscope shown in FIG. 3.

As described above, it is confirmed that the capillaries for optical fiber according to the present invention allow a low-loss optical connector connection of light signal without the core adjusting operation.

Figure 6:
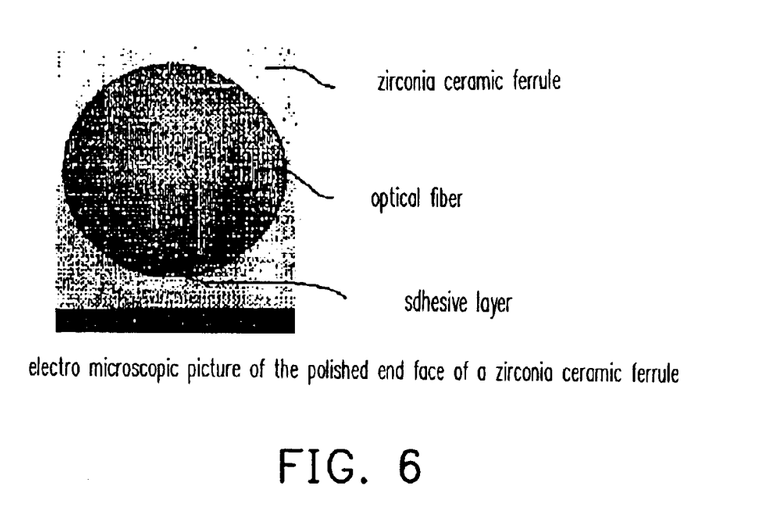
FIG. 6 is an electron microscopic picture of the end face of the ferrule for optical connector using a polished (or grinding) zirconia ceramic capillary.

Meanwhile, in comparison with the above conclusion, there is provided a zirconia ceramic capillary having a concentricity of 1.0 $\mu$m or less, an inner diameter larger than the outer diameter of an optical fiber to be inserted by approximately 1.0 $\mu$m, and Ra value less than 0.1 $\mu$m. After injecting an adhesive in the inner hole of the capillary, the optical fiber is inserted into the inner hole and fixed under the hardening condition of 100° C. heat treatment for one hour to make an optical connector plug. Then, the end face for connection is ground and observed via an electro microscope. As observed in FIG. 6, one side of the adhesive layer, in the inner hole is obviously has become thick, indicating that the optical fiber is eccentric toward the side wall opposite to the thick part of the layer. The gap formed by the inner hole of the ferrule forming the optical connector plug and the outer diameter of the optical fiber is 0.1 $\mu$m at the narrowest part, showing an eccentricity of approximately 0.9 $\mu$m.

Actually, 8 sample ferrules for optical connector are manufactured, using the zirconia ceramic capillary, and are connected in random with no core adjustment.

Figure 7:
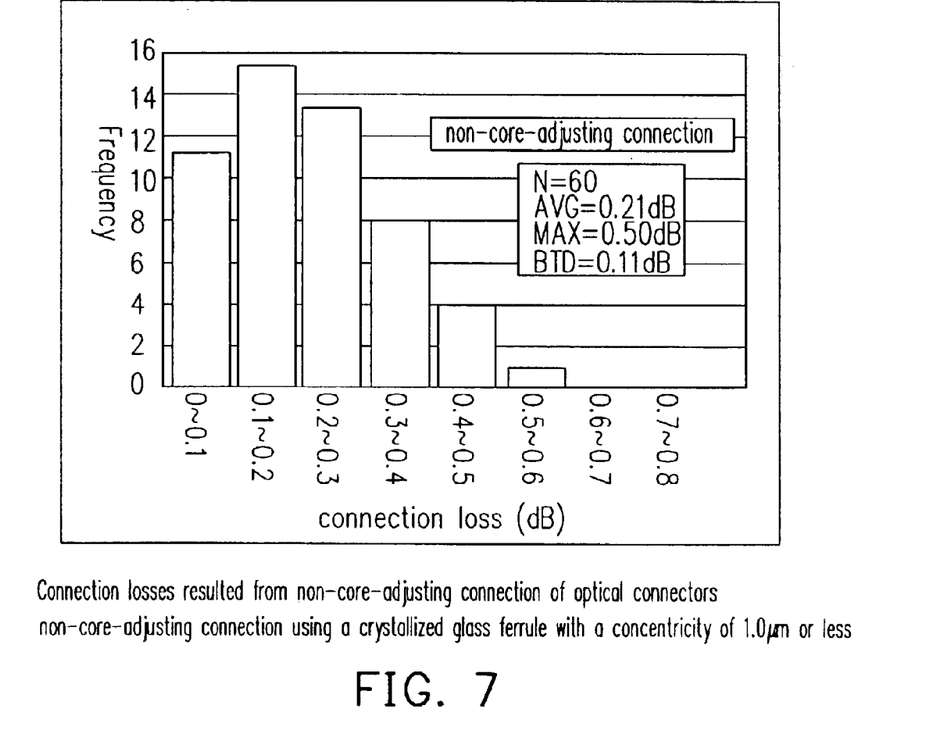
FIG. 7 represents the connection loss distribution of the optical connector using a zirconia ceramic capillary with a concentricity of 1.0 μm or less under the condition of non-core adjusting connection.

In dimensional estimation, the theoretical maximum axial dislocation with no core adjustment is 2.0 $\mu$m, which causes a connection loss of 0.69 dB in maximum according to the equation (1). The actual measurement result obtained under non-core-adjusted connection is that the average connection loss is 0.21 dB, the maximum connection loss is 0.50 dB, and the standard deviation is 0.11 dB, indicating that the core of the optical fiber has hardly been adjusted. The connection losses distribution of this example is shown in FIG. 7. To estimate the maximum value of connection loss, the value 3 time as much as the standard deviation $\sigma$ is added to the average value of connection loss and the maximum connection loss is calculated in 99.7% probability. The result is 0.54 dB. The connection loss of this value is to cause 1.76 $\mu$m of axial dislocation according to the equation (1) and this axial dislocation value coincides with the estimation in the case of no core adjusting effect. This result coincides with the observation of the electro microscopic picture shown in FIG. 6. The above results provide a confirmation that the core adjustment of the optical fiber in the inner hole hardly occurs in a zirconia ceramic capillary for optical fiber, in which the surface roughness of the inner hole are small.

Figure 8:
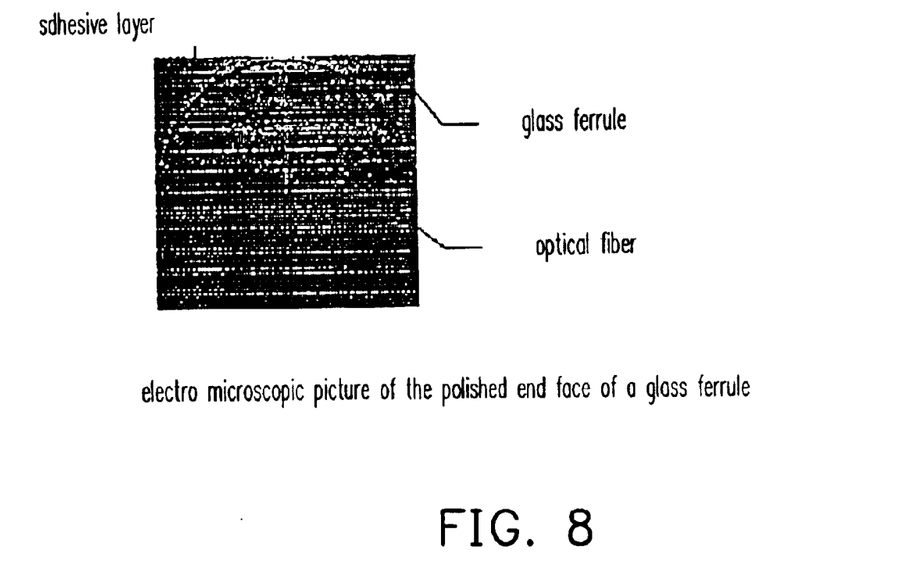
FIG. 8 is an electron microscopic picture of the end face of the ferrule for optical connector using a polished (or grinding) borosilicate glass capillary.

In the case of a borosilicate glass capillary for optical fiber manufactured by the drawing forming, the surface roughness is equal to that of a zirconia ceramic capillary, or Ra value is less than that of a zirconia ceramic capillary. Like the case of zirconia ceramic capillary, a borosilicate glass capillary is prepared under the condition that its Ra value is 0.1 $\mu$m or less, concentricity is 1.0 $\mu$m or less, and inner diameter is larger than the outer diameter of an optical fiber to be inserted by approximately 1.0 $\mu$m. After injecting an adhesive, the optical fiber is inserted and is fixed under the solidification condition of 100° C. heat treatment for one hour to make an optical connector plug. Then, the ground end face of the ferrule for optical connector is observed via an electro microscope. As observed in FIG. 8, one side of the adhesive layer in the inner hole is obviously has become thick, as it happens in the zirconia ceramic capillary, indicating that the optical fiber is eccentric toward the side wall opposite to the thick part of the layer. The gap formed by the inner hole of the ferrule and the outer diameter of the optical fiber is 0.05 $\mu$m at the narrowest part.

Actually, 12 sample ferrules for optical connector is manufactured, using the above borosilicate glass capillary for optical fiber, and are connected in random with no core adjustment.

Figure 9:
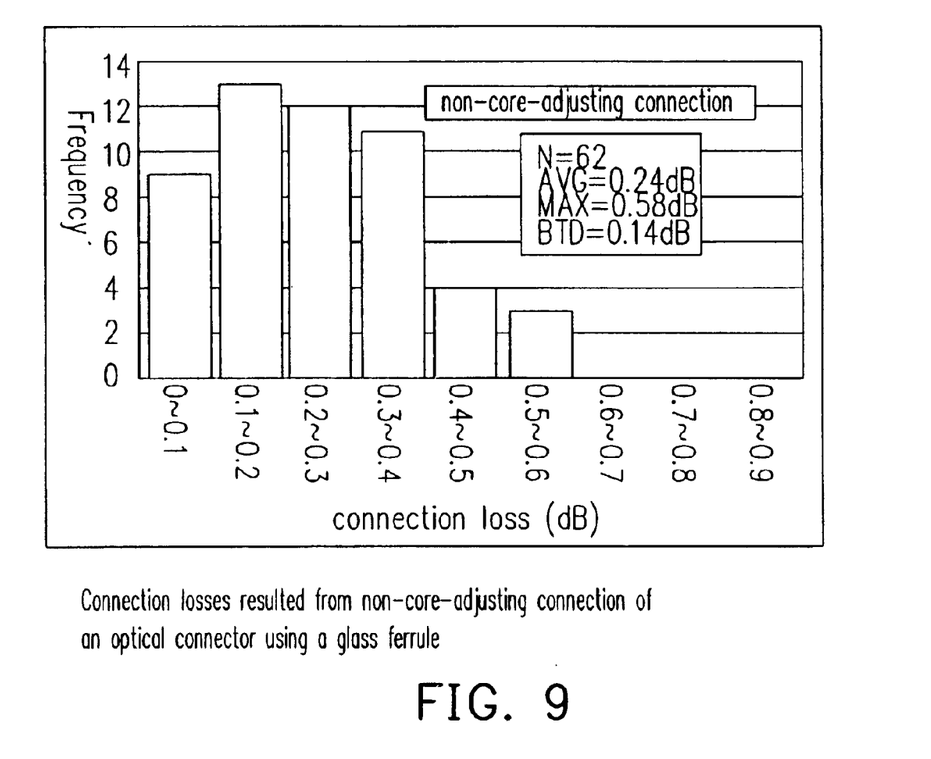
FIG. 9 represents the connection loss distribution of the optical connector using the borosilicate glass capillary with a concentricity of 1.0 μm or less under the condition of non-core adjusting connection.

In dimensional estimation, the theoretical maximum axial dislocation with no core adjustment is 2.0 μm, which causes a connection loss of 0.69 dB in maximum according to the equation (1). The actual measurement result obtained under non-core-adjusted connection is that the average connection loss is 0.24 dB, the maximum connection loss is 0.58 dB, and the standard deviation is 0.14 dB. The connection losses distribution of this example is shown in FIG. 9. To estimate the maximum value of connection loss, the value 3 time as much as the standard deviation a is added to the average value of connection loss and the maximum connection loss is calculated in 99.7% probability. The result is 0.66 dB. The connection loss of this value is to cause 1.95 μm of axial dislocation according to the equation (1), which coincides with the estimation in the above case of no core adjustment effect. This result leads to a conclusion that the core adjustment of the optical fiber in the inner hole hardly occurs in an optical fiber stub using a borosilicate glass capillary, in which the surface roughness of the inner hole is an extremely small. The above result almost coincides with the observation of the electro microscopic picture shown in FIG. 8.

A demonstrated above, when the surface roughness Ra value is less than 0.1 μm, the optical fiber becomes eccentric in the inner hole of the ferrule for optical fiber, so that, in addition to the concentricity between the inner and the outer surface of the ferrule for optical connector, the diametrical difference between the inner hole and the optical fiber also contributes to the axial dislocation upon connecting optical connectors.

Next to be described is the manufacturing method of the ferrule for optical fiber, the ferrule for optical connector and the optical-fiber-fixed capillary using the ferrule for optical fiber, according to the present invention.

When the capillary for optical fiber of the present invention is manufactured, for example, a basic material is prepared first, which is made of crystallized glass composed of a glass phase and a crystallized phase in the ratio of 50% to 50%. The crystallized glass is subjected to a drawing processing, by which an optical fiber is manufactured, under a shaping temperature of about 1200° C. to make the capillary. A heat treatment corresponding to the crystal precipitating condition of the basic material is carried out before the drawing forming reach the final stage, so that the diameter of precipitated crystal grain becomes 0.1 μm to 1.0 μm. For example, by precipitating the crystal grain of β-spodumene and the like while its diameter is controlled, the capillary having the inner hole with the surface Ra value of 0.1 μm to 0.5 μm is manufactured. Or, the above process enables the manufacturing the capillary having the inner hole with the surface roughness Ra value of 0.1 μm to 0.5 μm and Ry value of 4.0 μm or less, the capillary having the inner hole with the surface roughness Ra value of 0.1 μm to 0.5 μm and the difference (between the average line and the peak line of 2.0 μm or less, and the capillary having the inner hole with the above surface roughness Ra and Ry values and the difference between the average line and the peak line of 2.0 μm or less.

It is also appropriate to manufacture the capillary having the inner hole with the surface roughness Ra value of 0.1 μm to 0.5 μm, the capillary having the inner hole with the surface roughness Ra value of 0.1 μm to 0.5 μm and Ry value of 4.0 μm or less, the capillary having the inner hole with the surface roughness Ra value of 0.1 μm to 0.5 μm and the difference 5 between the average line and the peak line of 2.0 μm or less, and the capillary having the inner hole with the above surface roughness Ra and Ry values and the difference between the average line and the peak line of 2.0 μm or less, by a heat treatment of the capillary made of crystallized glass after forming of machining.

For manufacturing the capillary in a mechanical mean, either material of crystallized glass, glass, or ceramics is available. When the capillary made of zirconia ceramics is manufactured, the internal surface grinding machine and the like used before the finish grinding (or polishing) is employed, wherein the dimension and shape of the grinding wire or the type and diameter of abrasive grain are properly selected according to the hardness or abrasive resistance of the material. In this manner, it is appropriate to manufacture the capillary having the inner hole with the surface roughness Ra value of 0.1 μm to 0.5 μm, the capillary having the inner hole with the surface roughness Ra value of 0.1 μm to 0.5 μm and Ry value of 4.0 μm or less, the capillary having the inner hole with the surface roughness Ra value of 0.1 μm to 0.5 μm and the difference δ between the average line and the peak line of 2.0 μm or less, and the capillary having the inner hole with the above surface roughness Ra and Ry values and the difference δ between the average line and the peak line of 2.0 μm or less.

Using the capillary manufactured in the above manner, the capillary 20 for optical fiber shown FIG. 1 (A) is manufactured. The capillary 20 for optical fiber has the inner hole 20a with the surface roughness Ra value of, for example, approximately 0.3 μm, Ry value of approximately 2.0 μm, the difference between the average line and the peak line of approximately 1.0 μm, wherein the inner diameter of the inner hole is approximately 1.0 μm (0.95 to 1.05 μm) larger than the outer diameter of an optical fiber to be inserted.

Next, an example of manufacturing the ferrule for optical connector of the present invention is described. The C-chamfering process is carried out on the outer periphery of an end face 20b almost perpendicular to the center axis of the capillary 20 for optical fiber, as shown in FIG. 1 (A), manufactured by the above method. If necessary, the preliminary convex-spherical grinding (or polishing) may be performed with putting the center of grinding (or polishing) on the end face of the inner hole 21a. The flange member 21f may be fixed on the end face 21c, on which the flared part 21e is formed for guiding the optical fiber into the inner hole 20a. Thus, the ferrule 21 for optical connector shown in FIG. 1 (B) is manufactured.

Figure 10:
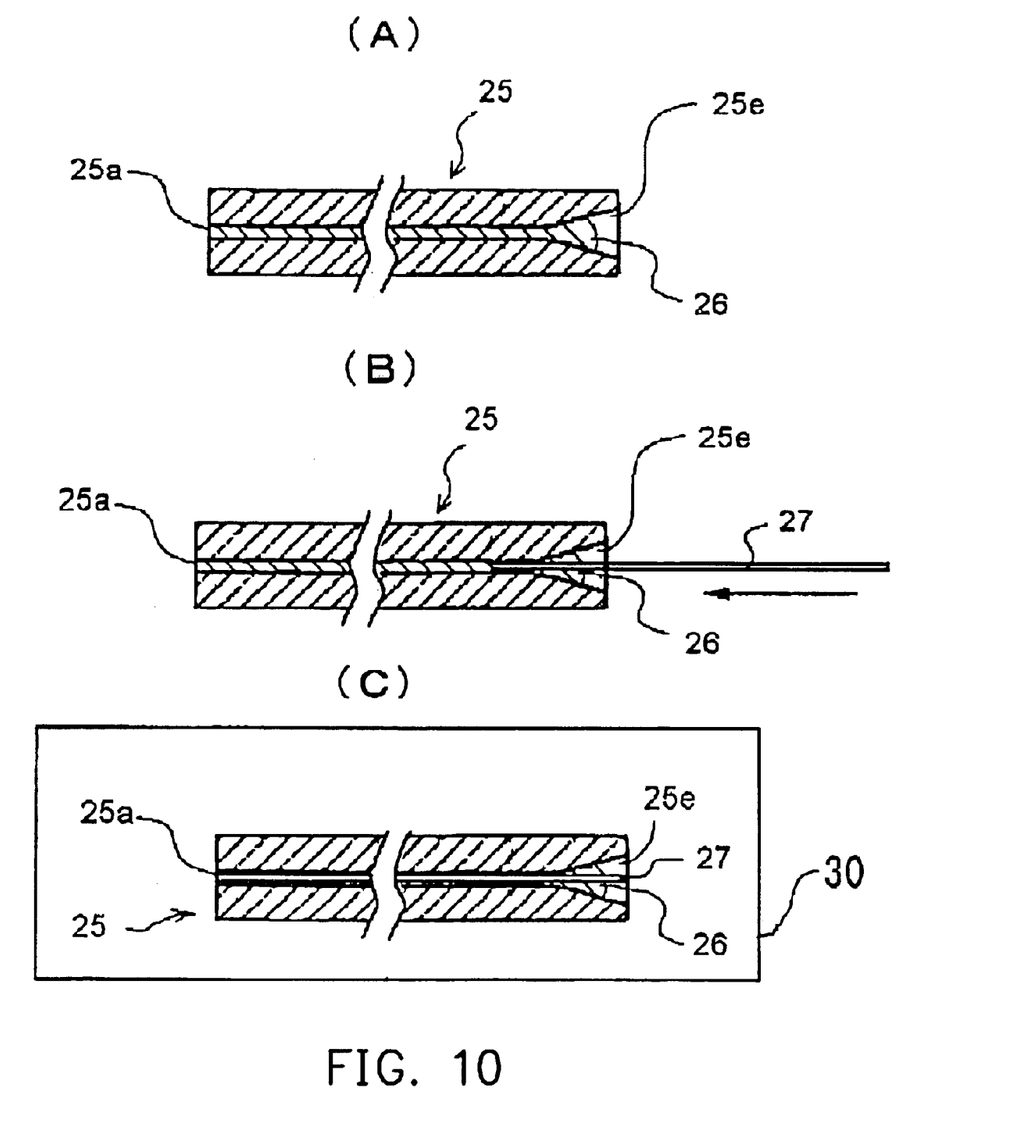

Next, an example of manufacturing the optical-fiber-fixed capillary of the present invention shown FIG. 1 (C) is described. The crystallized glass capillary manufactured by the above method or the capillary manufactured by a mechanical mean is prepared. As shown in FIG. 10, the capillary 25 has an outer diameter of a high circularity of 1.249 mm±0.5 μm, an inner diameter 25a of 126 μm+1/−0 μm with respect to the diameter of 125 μm of a crystal optical fiber, and a concentricity of 1.0 μm or less. The capillary 25 can precisely position and retain an optical fiber with respect to an almost cylindrical ferrule for optical connector with a nominal diameter D of 1.25 mm. On one end of the capillary 25, an almost cone-shaped flared part 25e for guiding the optical fiber 22 to facilitate its insertion.

When manufacturing the optical-fiber-fixed capillary, an adhesive 26 is filled into the inner hole 25a of the capillary 25, as shown in FIG. 10 (A), utilizing a capillary phenomenon or a aspirator or a pressured filling devises. Then, an optical fiber 27, from which a covering is removed, is inserted from the flared part 25e, as shown in FIG. 10 (B). At this time, the adhesive 26 is filled uniformly into the gap between the inner hole 25a and the optical fiber 27 so as not to form any air bubble, while the optical fiber 27 is inserted. After that, the optical fiber is fixed in the capillary 25 by setting the adhesive 26.

When the adhesive 26 has a thermosetting property, the adhesive 26 in the capillary 25 is set as it is placed in an oven 30 programmed to work along a prescribed temperature schedule. At this time, for example, when an adhesive hardening under 100° C. heat treatment for one hour is selected, it is recommended that the capillary is kept placed in the oven under the temperature of 20° C. to 70° C. for over 5 hours, or that the adhesive is set under the temperature of over 100° C. first and the capillary kept placed under the temperature of 70 to 20° C. for over an hour as the temperature in the oven decline. Through the above process, a contraction stress or air bubble produced upon setting the adhesive is reduced.

Figure 11:
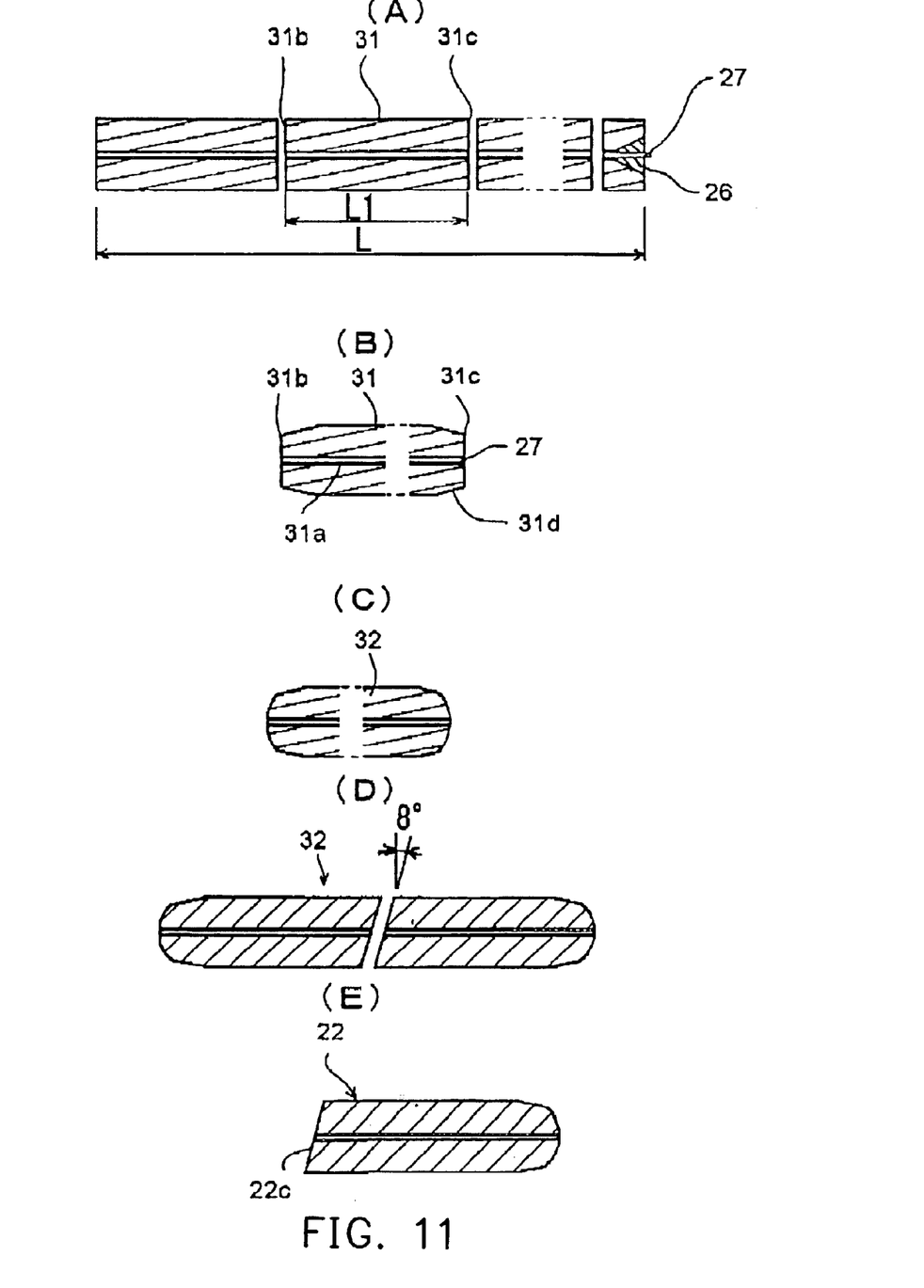

Next, an example of manufacturing an optical fiber stub is described. As shown in FIG. 11, the lengthy capillary 25 having a length L of approximately 250 mm, into which the optical fiber 27 is fixed, is cut to obtain a capillary 31 having a length L1 of 12.5 mm (prescribed length: 6 mm×2+cutting margin: 0.4 mm+grinding or polishing margin: 0.1 mm), into which the optical fiber 27 is fixed. With respect to the end faces 31b, 31c of the capillary 31 with the optical fiber 27, C-chamfered parts 31d of 45 degree are formed and R process is carried out on the corner defined between the C-chamfered part 31d and a side plane. Then, the end faces 31b, 31c are subjected to PC grinding (or polishing) process in a convex-sphere to make an optical-fiber-fixed member 32.

As shown in FIG. 11 (D), the optical-fiber-fixed member 32 is cut in the middle along the line slant at 8 degree with respect to the plane having its normal as the axial center of the member. Then, the cut 8 degree-slanted part is ground into a mirror surface to make the optical fiber stub 22.

Or, the C-chamfered part 31d of 45 degree is formed on the end face 31b of the capillary 31 with the optical fiber 27 having the length L1 of 6 mm, the corner defined between the C-chamfered part 31d and the side plane is subjected to R processing, and the end face 31a is subjected to PC grinding (or polishing) in a convex-sphere. The end face 31c is ground (or polished) slant until an angle of 8 degree is formed and is further ground (or polished) into a mirror surface for finishing to make the optical fiber stub 22.

For measuring Ra value of the surface roughness of the inner hole of the capillary for optical fibers, Surfcom made by Tokyo Seimitsu Co., ltd is employed, which is used for a sensing method that a diamond probe is made come in contact with the surface of a sample. The measurement has been conducted in the condition that vertical magnification is 10,000 times, average magnification is 50 times, and measuring speed is 0.3 mm/sec. The electro microscopic pictures are taken with magnification of 700 times.

According to this invention, utilizing a prescribed surface roughness formed in the inner hole makes it possible to manufacture the capillary for optical fiber, the ferule for optical connector, and the optical-fiber-fixed capillary, which enable a low connection loss demanded increasingly as optical communication techniques develop, wherein the above capillary for optical fiber and optical-fiber-fixed capillary can obtain the good connection loss without requiring the core adjusting operation and are manufactured at a low cost. Thus, an optical connector employing the above capillary for optical fiber or an optical device employing the above optical-fiber-fixed capillary can be provided.

What is claimed is:

1. A capillary for optical fiber comprising an inner hole with an inner diameter allowing an optical fiber to be inserted and retained therein, wherein Ra value of the surface roughness of the inner hole is larger than 0.1 μm and less than or equal to about 0.5 μm.

2. The capillary for optical fiber claimed in claim 1, wherein $R_y$ value of the surface roughness of the inner hole is 4.0 μm or less.

3. The capillary for optical fiber claimed in claim 1, wherein the difference between the average line and the peak line of the surface roughness of the inner hole is 2.0 μm or less.

4. The capillary for optical fiber claimed in claim 2, wherein the difference between the average line and the peak line of the surface roughness of the inner bole is 2.0 μm or less.

5. The capillary for optical fiber claimed in claim 1, which is made of crystallized glass formed by precipitating crystals in amorphous glass and in which crystallized grams are precipitated on the surface of the inner hole.

6. The capillary for optical fiber claimed in claim 2, which is made of the crystallized glass formed by precipitating crystals in amorphous glass and in which crystallized grains are precipitated on the surface of the inner hole.

7. The capillary for optical fiber claimed in claim 3, which is made of the crystallized glass formed by precipitating crystals in amorphous glass and in which crystallized grains are precipitated on the surface of the inner hole.

8. The capillary for optical fiber claimed in claim 4, which is made of the crystallized glass formed by precipitating crystals in amorphous glass and in which crystallized grains are precipitated on the surface of the inner hole.

9. The capillary for optical fiber claimed in claim 1, wherein the surface roughness of the inner hole is formed by a mechanical process mean.

10. The capillary for optical fiber claimed in claim 2, wherein the surface roughness of the inner hole is formed by a mechanical process mean.

11. The capillary for optical fiber claimed in claim 3, wherein the surface roughness of the inner hole is formed by a mechanical process mean.

12. The capillary for optical fiber claimed in claim 4, wherein the surface roughness of the inner hole is formed by a mechanical process mean.

13. A ferrule for optical connector comprising a capillary for optical fiber, the capillary for optical fiber having an inner hole with an inner diameter allowing an optical fiber to be inserted and retained therein, the inner hole having a surface roughness with Ra value being larger than 0.1 μm to and less than or equal to about 0.5 μm, wherein a chamfered part is formed on one end of the capillary for optical fiber for guiding the ferrule into a sleeve and a flared part is formed on the other end of the capillary for optical fiber for guiding the optical fiber into the inner hole.

14. The ferrule for optical connector claimed in claim 13, wherein Ry value of the surface roughness of the inner hole is 4.0 gin or less.

15. The ferrule for optical connector claimed in claim 13, wherein the difference between the average line and the peak line of the surface roughness of the inner hole is 2.0 μm or less.

16. The ferrule for optical connector claimed in claim 14, wherein the difference between the average line and the peak line of the surface roughness of the inner hole is 2.0 μm or less.

17. An optical-fiber-fixed capillary comprising a capillary for optical fiber, the capillary for optical fiber having an inner hole with an inner diameter allowing an optical fiber to be inserted and retained therein, the inner hole having a surface roughness with Ra value being larger than 0.1 μm to and less than or equal to about 0.5 μm, and an optical fiber inserted and fixed in the inner hole of the capillary for optical fiber.

18. The optical-fiber-fixed capillary claimed in claim 17, wherein Ry value of the surface roughness of the inner hole is 4.0 μm or less.

19. The optical-fiber-fixed capillary claimed in claim 17, wherein the difference between the average line and the peak line of the surface roughness of the inner hole is 2.0 μm or less.

20. The optical-fiber-fixed capillary claimed in claim 18, wherein the difference between the average line and the peak line of the surface roughness of the inner hole is 2.0 μm or less.

* * * * *